(12) United States Patent
Clement et al.

(10) Patent No.: US 12,492,650 B2
(45) Date of Patent: Dec. 9, 2025

(54) TURBOJET ENGINE NOZZLE RING FOR AN AIRCRAFT

(71) Applicant: Safran Aircraft Engines, Paris (FR)

(72) Inventors: Alice Marie Clement, Moissy-Cramayel (FR); Paul Grandin, Moissy-Cramayel (FR); Clément Marchand, Moissy-Cramayel (FR); Vijeay Patel, Moissy-Cramayel (FR); Mireya Sanchez Gomez, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 235 days.

(21) Appl. No.: 18/278,991

(22) PCT Filed: Feb. 18, 2022

(86) PCT No.: PCT/FR2022/050299
§ 371 (c)(1),
(2) Date: Aug. 25, 2023

(87) PCT Pub. No.: WO2022/180329
PCT Pub. Date: Sep. 1, 2022

(65) Prior Publication Data
US 2024/0133302 A1    Apr. 25, 2024
US 2024/0229657 A9    Jul. 11, 2024

(30) Foreign Application Priority Data
Feb. 26, 2021  (FR) ........................................ 2101915

(51) Int. Cl.
*F01D 25/24*    (2006.01)
*F01D 9/02*     (2006.01)
(Continued)

(52) U.S. Cl.
CPC ............. *F01D 25/246* (2013.01); *F01D 9/02* (2013.01); *F01D 25/005* (2013.01); *F01D 25/28* (2013.01);
(Continued)

(58) Field of Classification Search
CPC ..... F01D 9/00; F01D 9/02; F01D 9/04; F01D 9/041; F01D 9/042; F01D 9/044;
(Continued)

(56) References Cited

U.S. PATENT DOCUMENTS

2006/0062673 A1*  3/2006  Coign ................... F01D 25/246
                                                416/214 A
2006/0275111 A1* 12/2006  Orlando .................. F02C 3/067
                                                415/191
(Continued)

FOREIGN PATENT DOCUMENTS

FR    3 011 270 A1    4/2015
FR    3 015 550 A1    6/2015

OTHER PUBLICATIONS

French Search Report for French Application No. FR 2101915, dated Oct. 27, 2021.
(Continued)

*Primary Examiner* — Elton K Wong
(74) *Attorney, Agent, or Firm* — Birch, Stewart, Kolasch & Birch, LLP (57) ABSTRACT

The turbomachine subassembly including at least one low-pressure nozzle ring, the nozzle ring including a root integral with the nozzle ring, a clamp configured so as to fasten the root to a casing of the turbomachine; and at least two pads interposed between the root and the clamp. Each pad being assembled in a form-fitting manner with one of either the root or the clamp.

20 Claims, 12 Drawing Sheets (51) Int. Cl.
  *F01D 25/00* (2006.01)
  *F01D 25/28* (2006.01)
(52) U.S. Cl.
  CPC ...... *F05D 2230/60* (2013.01); *F05D 2230/70* (2013.01); *F05D 2230/72* (2013.01); *F05D 2300/224* (2013.01)
(58) Field of Classification Search
  CPC ...... F01D 25/005; F01D 25/246; F01D 25/28; F05D 2220/3212; F05D 2230/60; F05D 2230/70; F05D 2230/72; F05D 2300/224
  See application file for complete search history.

(56) References Cited

U.S. PATENT DOCUMENTS

2015/0089957 A1* 4/2015 Schwartz ................ F02C 7/20
  60/796
2018/0016904 A1* 1/2018 Mervant ................ F01D 5/14

OTHER PUBLICATIONS

International Search Report for International Application No. PCT/FR2022/050299, dated Jul. 7, 2022.

* cited by examiner

TURBOJET ENGINE NOZZLE RING FOR AN AIRCRAFT

FIELD OF THE INVENTION

The invention relates to turbomachines such as aircraft turbojet engines.

PRIOR ART

Airplane double flow turbojet engines are known which comprise a fan, a low-pressure compressor, a high-pressure compressor, a combustion chamber, a high-pressure turbine and a low-pressure turbine. The low-pressure turbine recovers a portion of the energy resulting from the combustion of gases for the operation of the fan, the compressor and the accessories.

The parts constituting the low-pressure turbine comprise the movable blades and the low-pressure nozzle rings. The gases expand in the low-pressure nozzle ring. This accelerates the flow and deflects it. This flow spins the rotor of the turbine which forms an impeller.

This invention enters into the scope of a solution of a recurring problem observed on the nozzle ring located at the first stage of the low-pressure turbine. The nozzle ring is formed by elements located successively in the circumferential direction around the axis. In fact, the characteristic of each element is that it is held from above and from below. The problem relates to its lower portion (i.e. the bottom of the lower platform), and more precisely the root or the strut of the nozzle ring element. This root serves to hold the part by being clamped. Yet on the one hand this contact generates wear by friction (or fretting), on the other hand the area is exposed during operation to a risk of type 2 corrosion by sulfur. Thus, the two combine to generate contact corrosion which can severely deteriorate the part.

Many pustules of corrosion have thus been observed on the root of the nozzle ring element, both in the fleet and during an endurance test. In the fleet, a situation of this type leads to the removal of the engine. In an endurance test, 17% of the parts are allowed to manifest cases of the appearance of corrosion at the root of a nozzle ring element, once the equivalent of 6,200 endurance cycles have been carried out.

To avoid corrosion, it is possible to contemplate adding a coating on the part. However, this coating does not persist for a long duration in the area due to friction.

Engine manufacturers seek to guarantee the operation of the parts and reduce engine removals. During the inspections of engines, wear results in the replacement of costly parts. In addition, the duration of the operation is not negligible (for example, due to the necessity of disassembling a complete turbine module to replace a part, then reassembling).

One object of the invention is therefore to facilitate the maintenance of turbomachines and to reduce their costs, when dealing with this phenomenon of contact corrosion.

Disclosure of the Invention

To this end, a turbomachine subassembly is provided according to the invention, the subassembly comprising,
- at least one low-pressure turbine nozzle ring, the nozzle ring comprising a root integral with a body of the nozzle ring,
- a clamp configured to attach the root to a casing of the turbomachine, and
- at least two pads interposed between the root and the clamp, each pad being assembled in a form-fitting manner with one among the root and the clamp.

Thus it is the pad and no longer the root, which is in contact with the clamp. The pad thus protects the root from friction and from contact corrosion. If the pad is damaged or worn, it is sufficient to replace it with a new pad, which is less costly than replacing the nozzle ring element itself. The invention thus avoids the coupled effect of wear and corrosion. If the root is covered with an anticorrosion coating, it protects the latter in the contact area. The invention allows, not avoiding wear, but ensuring that it is rapidly assessed while avoiding the aggravating combination with corrosion, and rapidly replacing the worn portion. It allows reducing maintenance costs because there are fewer parts to be changed and less turbine removal. It also allows improving the performance of the machine because, during an inspection, the placing of a new pad ensures less leakage. It therefore allows controlling a phenomenon which was previously experienced by the blading.

It can be provided that each pad is assembled to the root or to the clamp in a form-fitting manner.

It can be provided that each pad is formed from a material different from a material of the root, for example a stellite, or even a material, such as carbon or graphite, that is less hard than a material of the root.

It can also be provided that each pad is formed from a material identical to a material of the root.

The subassembly can also have at least any one of the following features:
- the clamp has no jaw and has main faces in contact with the pads;
- the pads constitute the jaws of the clamp;
- it comprises are least one protrusion, for example at least two protrusions, on one among the root and the clamp, configured to penetrate into a cavity of the other among the root and the clamp;
- the or each protrusion has the shape of a rectangular parallelepiped;
- the pads are two in number;
- the pads are four in number, the root having two faces, each face being in direct contact with two of the pads, the two pads in direct contact with each face being for example spaced away from one another;
- each pad has a wear indicator;
- the clamp comprises jaws in contact with the pads;
- the pads are attached directly to jaws of the clamp;
- each pad extends exclusively facing the root; and
- the root bears an anti-corrosion coating.

Also provided according to the invention is a turbomachine such as an aircraft turbojet engine, comprising a subassembly according to the invention.

Provided moreover, according to the invention, is a manufacturing method of a turbomachine such as an aircraft turbojet engine, comprising:
- assembling two pads in a form-fitting manner to one among a root of a low-pressure turbine nozzle ring and a clamp, the root being integral with a body of the nozzle ring,
- attaching the clamp to the root so that the pads are interposed between the root and the clamp, and
- attaching the clamp to a casing of the turbomachine.

Finally, a method for maintaining a turbomachine such as an aircraft turbojet engine is provided according to the invention, comprising:
- disassembling a first pad interposed between a low-pressure turbine nozzle ring and a clamp configured to attach the root to a casing of the turbomachine, the root being integral with a body of the nozzle ring, assembling a second pad in place of the first pad in a form-fitting manner with one among the root and the clamp, and attaching the clamp to the root so that the second pad is interposed between the root and the clamp.

DESCRIPTION OF THE FIGURES

We will now present an embodiment of the invention by way of a non-limiting example, supporting the drawings in which.

Figure 1:
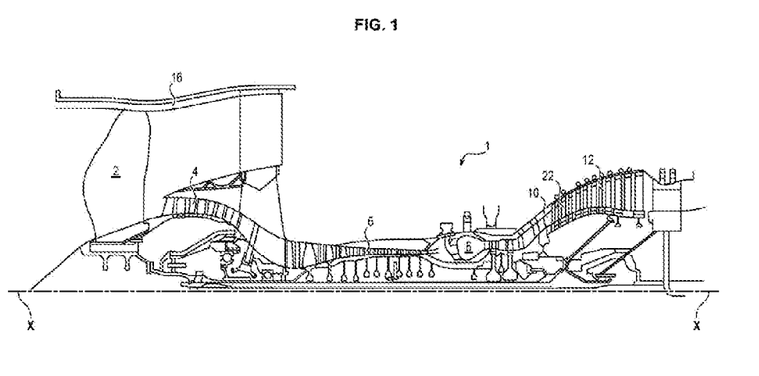
FIG. 1 is a partial section axial view of an airplane turbojet engine forming a machine according to the invention.

FIG. 1 illustrates an aircraft turbojet engine 1 according to the invention. This is a turbojet forming here a turbomachine with double flow and twin spools. The turbomachine has a main axis X-X.

It comprises, from upstream to downstream, hence from left to right in FIG. 1, a fan 2, a low-pressure compressor 4, a high-pressure compressor 6, a combustion chamber 8, a high-pressure turbine 10 and a low-pressure turbine 12. These members have portions movable in rotation around the axis X-X.

The compressors 4, 6, the combustion chamber 8 and the turbines 10, 12 define a main air flow stream. A nacelle 16 surrounds the fan 2 so as to form a fan compartment and to define a secondary air flow stream.

Conventionally, an air flow which penetrates into the turbomachine at an air inlet is compressed, then is mixed with fuel and burned in the combustion chamber 8, the combustion gases allowing driving one or more turbine rotors in rotation around the axis. For example, the high-pressure turbine 10 drives the high-pressure compressor 6, and the low-pressure turbine 12 drives the low-pressure compressor 4 and the fan 2. The terms upstream and downstream refer generally to the circulation of air in the turbomachine from its inlet to its outlet.

The fixed portion of the turbomachine comprises in particular a casing, for example an inter-turbine casing 22, which is an intermediate casing interposed between the high-pressure and low-pressure turbines housed in their respective casings.

Each of the high- and low-pressure turbines comprises a plurality of stages, each with a nozzle ring fixed relative to the casing, receiving a flow of gas and straightening it to apply it to an impeller turning in a given direction.

Figure 2:
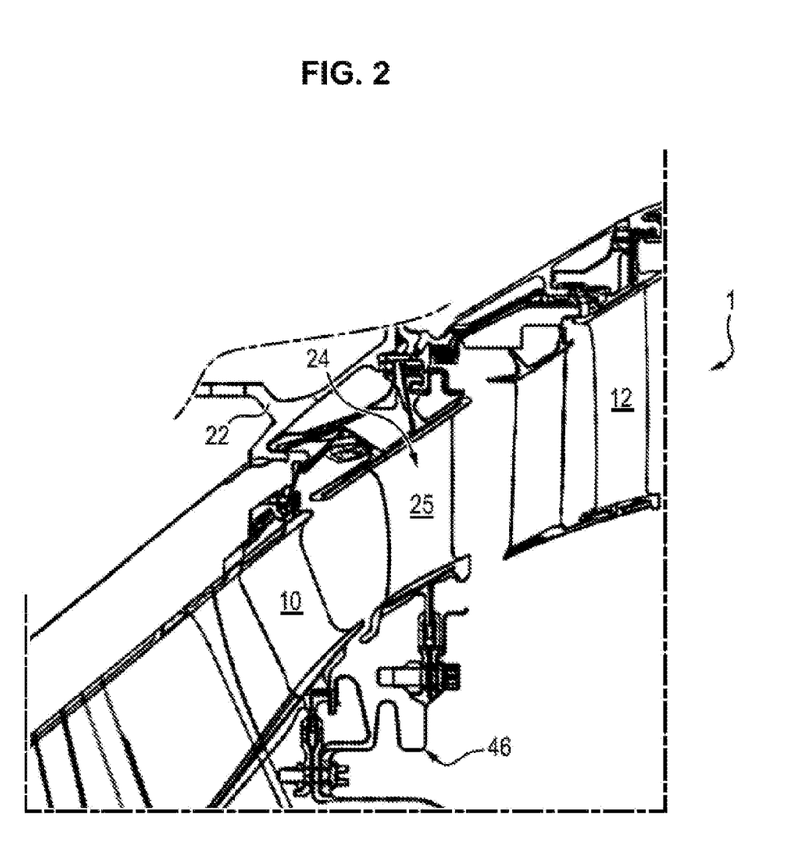
FIG. 2 is a view at a larger scale of a portion of the turbojet of FIG. 1.

Attention is paid hereafter to the low-pressure nozzle ring 24 located at the inlet of the low-pressure turbine 12, i.e. the nozzle ring upstream of this turbine. It is located downstream of a fluid straightener of the high-pressure turbine 10 (or TCF casing for turbine center frame), for example directly downstream of the straightener, or downstream of an impeller itself located downstream of the straightener. The nozzle ring 24 thus corresponds to the first stage of fixed blades of the low-pressure turbine. Alternatively, the nozzle ring 24 can be located downstream from the low-pressure turbine, or at another turbine.

Figure 3:
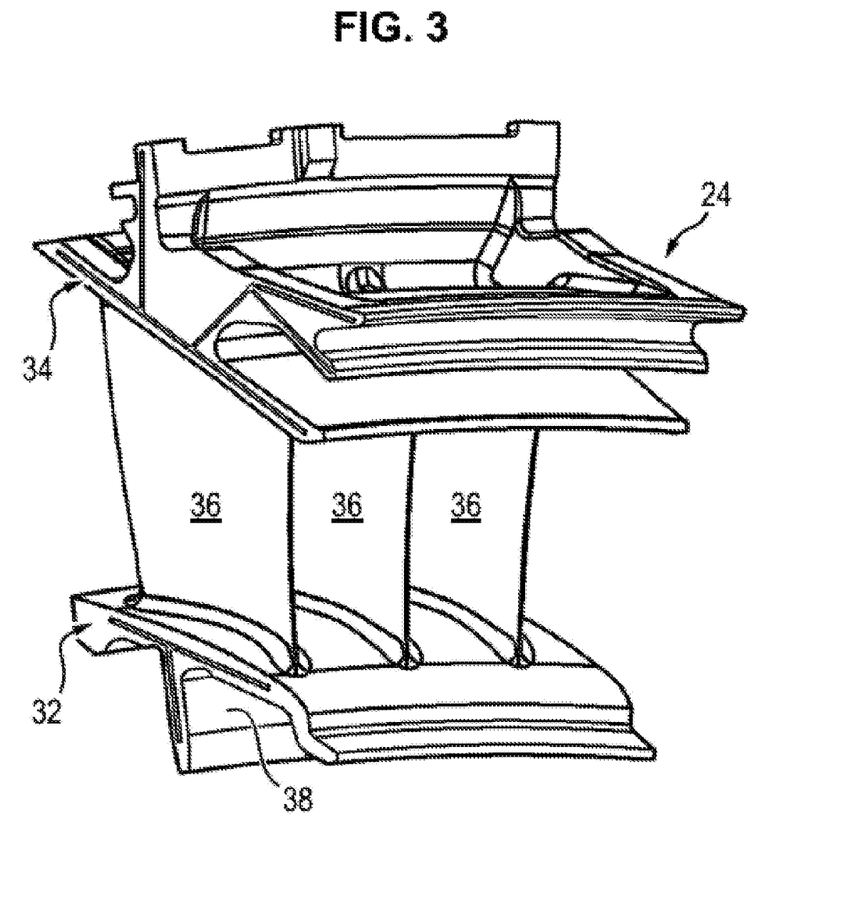
FIG. 3 is a perspective view of a nozzle ring of the machine of FIG. 1.

The nozzle ring 24 has an annular shape centered on the axis X-X. It is formed from nozzle ring sectors or elements 25. With reference to FIG. 3, each element 25 comprises a body having an inner (or lower) platform 32 or internal shroud, an upper (or outer) platform 34 or external shroud and several blades 36 extending in the radial direction between the platforms 32, 34 and connected to them. The upper platform 34 is farther away from the axis than the lower platform 32.

On the outside of the upper platform 34, the nozzle ring element 25 is connected to the casing by conventional means which will not be detailed.

Figure 4:
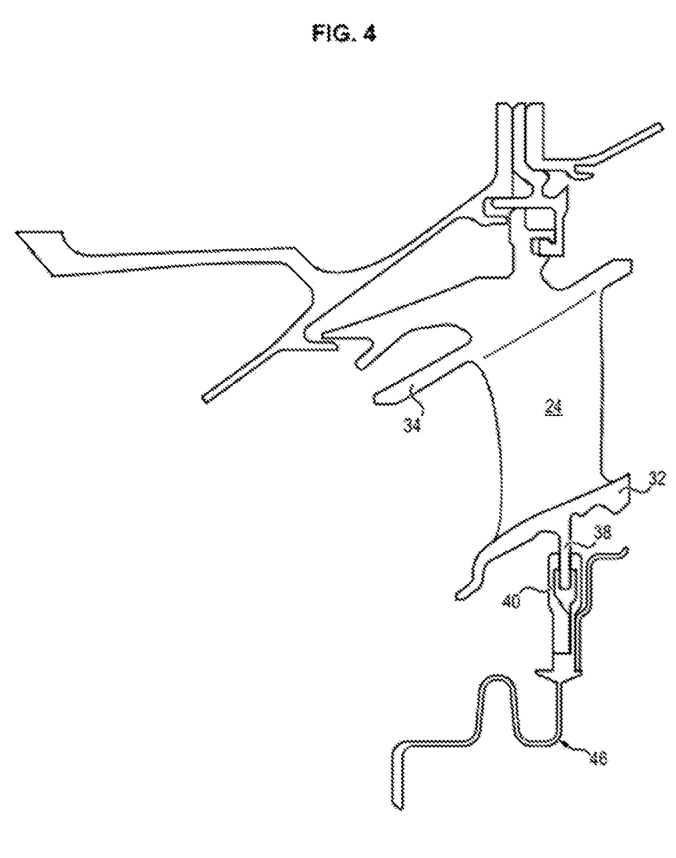
FIGS. 4 to 6 are views showing the attachment of the nozzle ring of FIG. 3 to the casing of the machine.
Figure 5:
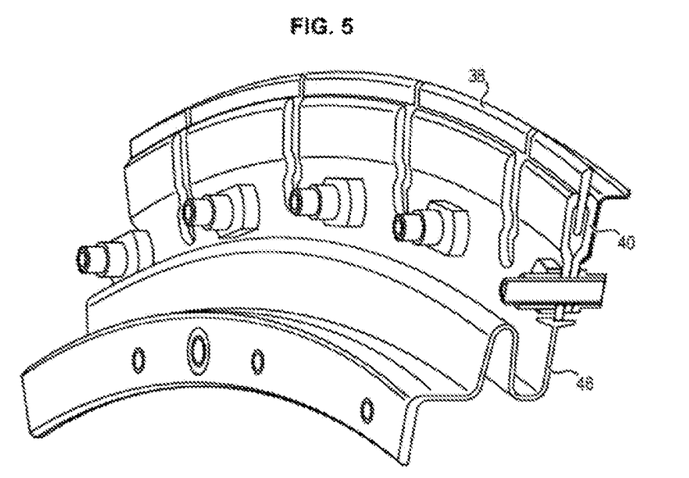

On the inside of the inner platform 32, the nozzle ring element 25 is continued by a root 38 protruding from the platform in the radial direction. The root has a flat shape located in a plane perpendicular to the axis, as shown in particular in FIG. 4. The root is integral with the body of the nozzle ring element 25. The root bears an anti-corrosion coating that is known per se.

Figure 6:
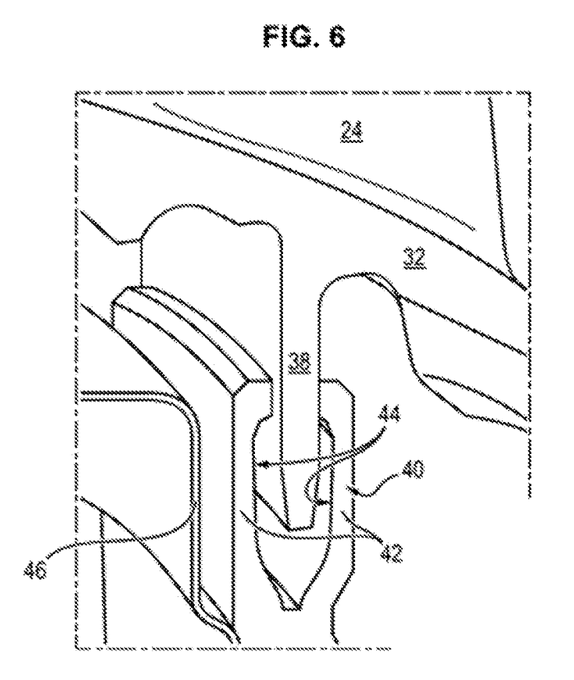

The machine also comprises for each nozzle ring element 25, a clamp 40 configured to attach the root 38 to the casing 22. As illustrated in particular in FIG. 6, this clamp comprises two branches 42 having two main faces 44 facing one another. It is designed to clamp the root between the two branches in the direction of the axis X-X.

The clamp 40 is connected to the inter-turbine casing by means of an annular flange 46. The flange is therefore configured to be connected securely to the fixed portion of the turbomachine and to the root 38 of the nozzle ring element. What is meant here by secure connection between two members is that the connection is such that a movement of one of the members according to a degree of freedom involves the same movement of the other according to the same degree of freedom. The secured connection is for example an attachment. This connection ensures the retention of the root 38 of the nozzle ring element 25. This connection can also allow separating the upstream and downstream portions of an area below the root 38.

The flange 46 is thus configured to separate the upstream and downstream portions of an area below the root 38 so as to prevent any fluid circulation below the root. It extends so as to separate an upstream chamber and a downstream chamber located respectively upstream and downstream of the root 38. The upstream chamber is provided between the inter-turbine casing and the flange.

Thus the sealed flange allows for example avoiding a circulation of hot air on certain members located downstream, typically turbine disks. The flange is designed to limit heat transfer by convection, conduction and/or radiation from the upstream chamber, in particular from the stream fluid to the flange.

The clamp 40 forms a housing allowing relative radial travel of the clamp and of the root during operation without risking the dislodging of the root out of the clamp 8. The clamp limits their relative movement in translation along the axis X-X.

We will now present several embodiments of the cooperation of the root with the clamp.

First Embodiment

Figure 7:
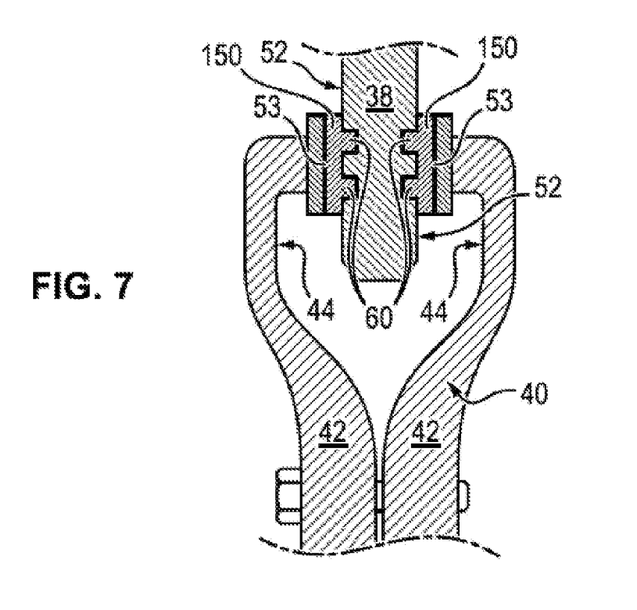
FIGS. 7 and 8 are side and perspective views showing the attachment of the root of the nozzle ring to the casing in a first embodiment of the invention.
Figure 8:
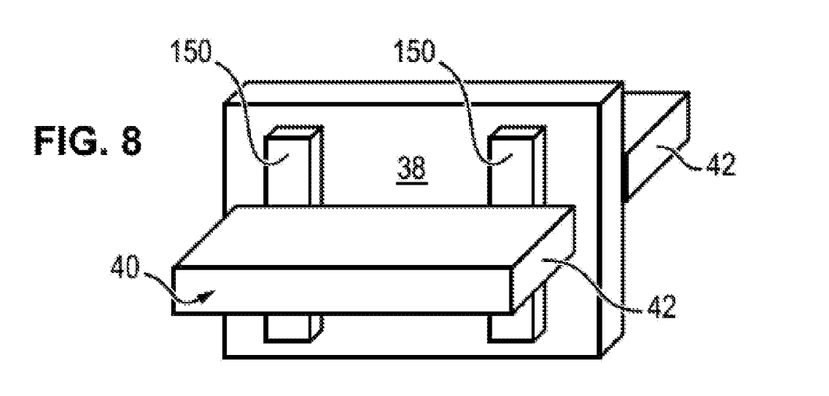

This embodiment is illustrated in FIGS. 7 and 8.

Here the root bears four pads 150. In FIG. 7, two of the pads are hidden by the pads in the foreground. In FIG. 8, two of the pads are hidden by the root.

Each of the pads has here the shape of a strip or of a rail. The strips have their longitudinal directions which are parallel to one another and near the radial direction.

The root having two opposite faces 52. Each of them is directly in contact with two of the pads 150. On each face, the two pads in direct contact with the face are spaced from one another in the direction circumferential to the axis X-X, as shown by FIG. 8.

Figure 11:
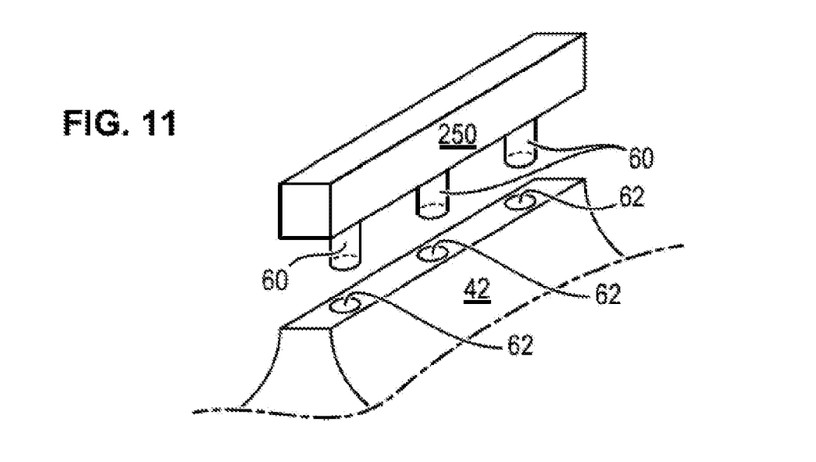

Each pad 150 is assembled in a form-fitting manner to the root 38. For example, each pad comprises three protuberances protruding from a face of the pad in contact with the root, as illustrated in FIG. 11 in support of the second embodiment. The protuberances are configured to penetrate into the respective cavities of the root provided for this purpose. It is also possible to provide, conversely, that the protuberances are located on the clamp and the cavities in the root.

Each pad 150 is interposed between the root and the clamp, as illustrated. Each branch of the clamp is therefore supported on the root by a jaw of the branch while being in contact exclusively with the two roots.

The pads thus form additional material on either side of the root to accommodate the clamp. The friction therefore occurs on these strips which can wear and are subsequently repairable.

Each pad 150 can be formed from the same material as the nozzle ring element 25, for example a metal alloy. It can also be formed from a material different from a material of the root, for example a stellite. A stellite is a metal alloy of which the main component is cobalt and the main alloying element is chromium. It can also contain a small quantity of tungsten or molybdenum and a small but important quantity of carbon. A stellite offers good resistance to contact friction.

During the manufacture of the turbojet engine, the pads 150 are assembled to the clamp in a form-fitting manner. Then the latter is attached to the root so that the pads are interposed between the root and the clamp, and the clamp is attached to the casing 22 by means of the flange. The assembly, gripped by the force of the clamp on the pads, ensures that they are held on the root.

During the maintenance of the turbojet engine, if the pads 150 are worn, they are disassembled by disengaging them from the root. Then new pads are assembled with the root in their place in a form-fitting manner, and the clamp is attached to the root so that the new pads are interposed between the root and the clamp. The replacement can also involve only one of the pads, or several of them without it being all of them.

It is possible to provide that each pad has a wear indicator, for example in the form of a marking 53 on the flank or the edge of the pad. When this marking is dented or disappears, it is a sign that the pad must be replaced. A wear indicator of this type shows rapidly and effectively whether the wear is acceptable or not. In the case where the pad is too worn, it is sufficient to replace it by deinterleaving it and interleaving a new pad, as explained.

Due to the invention, the root of the nozzle ring element retains its anti-corrosion coating intact, and friction is controlled.

In the embodiments and the variant that follow, common members will not be described again. The description will apply only to the features that differ.

Second Embodiment

Figure 9:
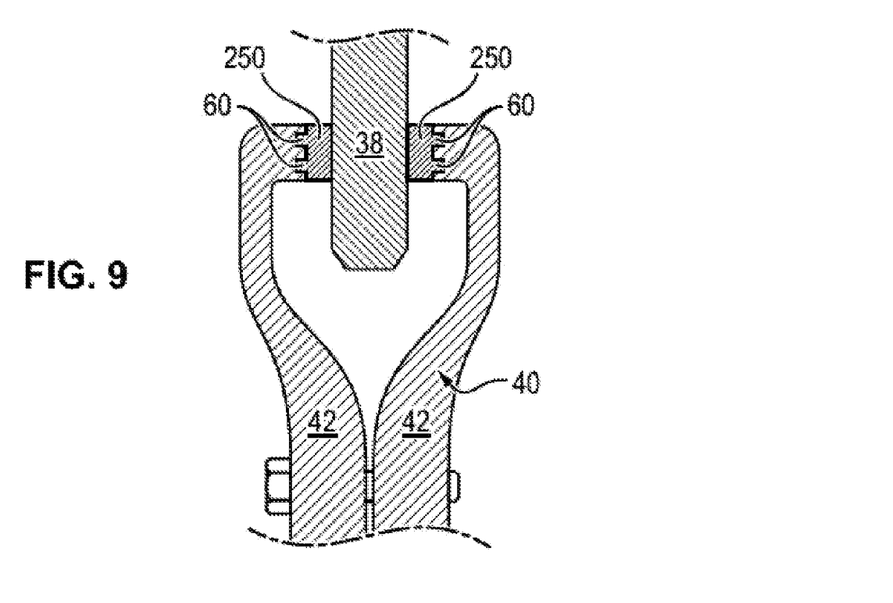
FIGS. 9 to 11 are similar views showing a second embodiment.
Figure 10:
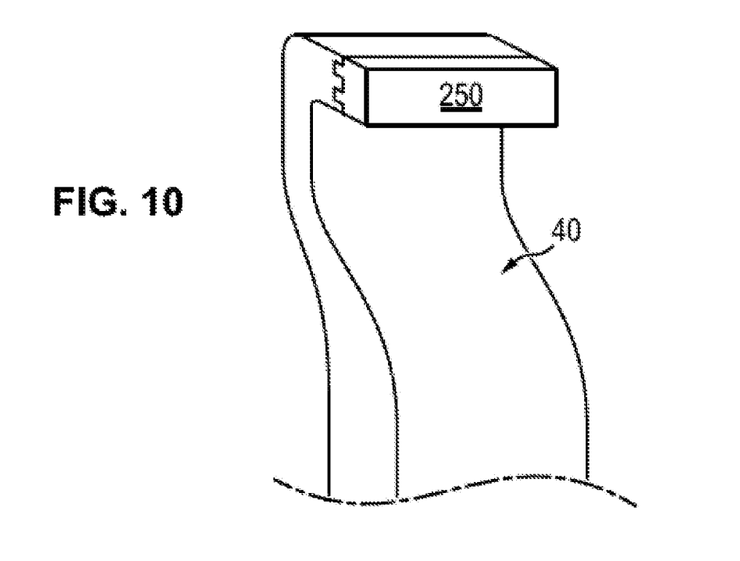

This embodiment is illustrated in FIGS. 9 to 11.

This time, the pads 250 are two in number. This feature, independently of those that follow, could be applied to the first embodiment.

This time, each pad 250 is assembled to the clamp 40 in a form-fitting manner, more precisely to the jaws of the branches of the clamp. FIG. 11 shows the protrusions 60 of one of the pads 250 facing the cavities 62 intended to receive them in the clamp.

In addition, but independently of it, each pad 250 is formed from a material that is less hard than a material of the root, such as carbon or graphite, a stellite or equivalent. This material can thus wear or erode during friction occurring in operation, thus reducing the force of contact friction.

This embodiment has the advantage of being easier to implement because, on the clamp, the quantity of material to provide for is smaller. In addition, no modification of the root of the nozzle ring element 25 is required, and there is no risk of problems with the application of the anti-corrosion coating on the nozzle ring. In addition, the geometry of the root is simplified because it is not necessary to provide for one or more cavities in it.

Variant

Figure 12:
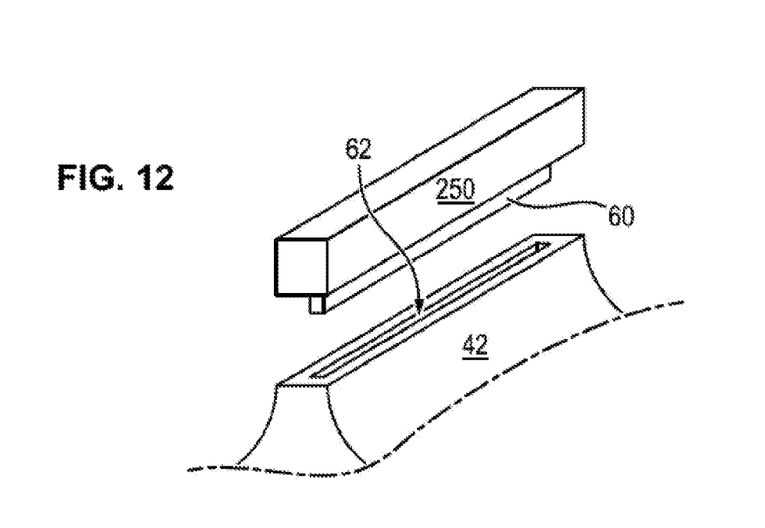
FIG. 12 illustrates a variant embodiment.

This variant is illustrated in FIG. 12.

It is based on the second embodiment.

Here, the protrusion 60 is unique and has, independently of that, an elongate shape of a rectangular parallelepiped. The cavity 62 has a female shape complementary to this male shape.

Third Embodiment

Figure 13:
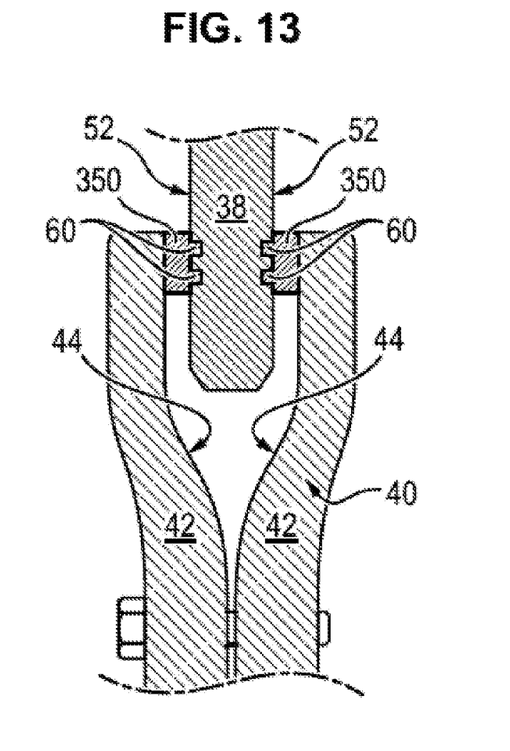
FIGS. 13 to 16 are views similar to FIGS. 7 and 8 illustrating two other embodiments.
Figure 14:
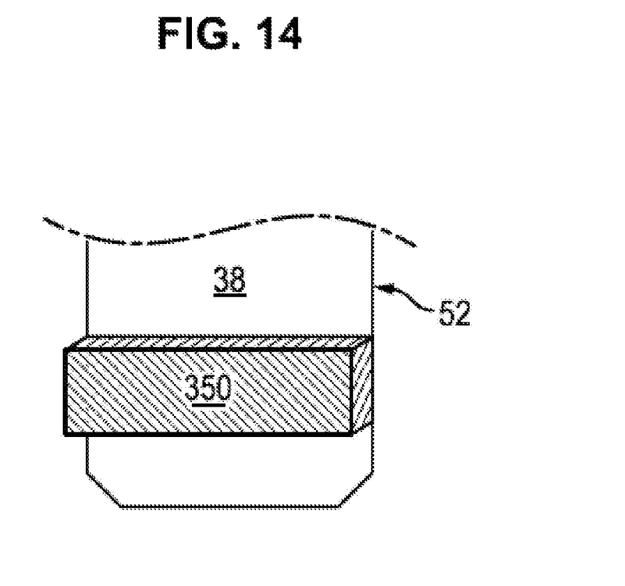

This embodiment is illustrated in FIGS. 13 and 14.

In this embodiment, the pads 350 are two in number and are located on the root. Each face 52 of the root bears a single pad, here in the form of a strip extending in the direction circumferential to the axis. The strip has a shape and a position which correspond to the support area of the clamp on each face 52.

Independently of this, the clamp is bereft of jaws. The main faces 44 of its branches 42 are directly in contact with the pads. It is understood, in fact, that in an arrangement of this type, the jaws of the clamp become useless.

This solution has the advantage that the geometry of the clamp is simplified. It also increases the support surface of the clamp on each face and makes sliding between the nozzle ring and the flange more difficult. It therefore reduces friction, delaying the necessary moment for changing the pads.

Fourth Embodiment

Figure 15:
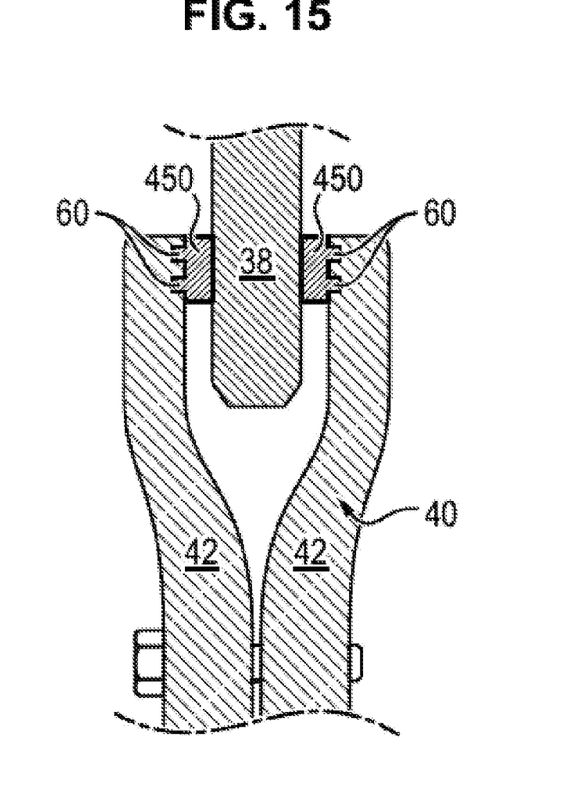
Figure 16:
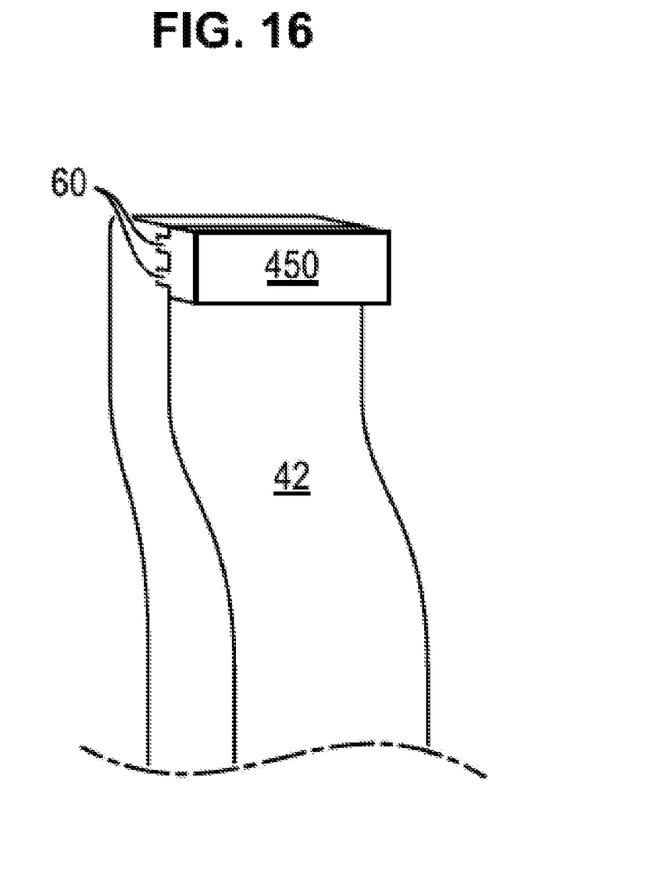

This embodiment is illustrated in FIGS. 15 and 16.

This time the pads 450, which are two in number, are attached to the clamp and constitute its jaws while protruding from the branches in the direction of the root.

It will be possible to apply numerous modifications to the invention without departing from its scope.

The solution is advantageous for all contact interfaces between two parts. Because this then causes wear of at least one of the parts and potentially the appearance of corrosion.

For example, it would be possible to contemplate this type of solution in place of the stellites in the collars of impellers. The invention has the advantage in particular of allowing easily replacing the pads over time.

The invention claimed is:

1. A turbomachine subassembly,
   the turbomachine subassembly comprising:
   at least one low-pressure turbine nozzle ring, the nozzle ring comprising a root integral with a body of the nozzle ring,
   a clamp configured to attach the root to a casing of the turbomachine, and
   at least two pads interposed between the root and the clamp, each pad being assembled in a form-fitting manner with one among the root and the clamp.

2. The subassembly according to claim 1, wherein each pad is assembled to the root in a form-fitting manner.

3. The subassembly according to claim 2, wherein each pad is formed from a material different from a material of the root.

4. The subassembly according to claim 3, wherein each pad is formed from a stellite.

5. The subassembly according to claim 2 wherein the clamp has main faces in contact with the pads.

6. The subassembly according to claim 1 wherein each pad is assembled in a form-fitting manner to the clamp.

7. The subassembly according to claim 6 wherein each pad is formed from a material that is less hard than a material of the root.

8. The subassembly according to claim 7 wherein each pad is formed from carbon or graphite.

9. The subassembly according to claim 6 wherein the pads constitute jaws of the clamp.

10. The subassembly according to claim 1 which comprises at least one protrusion on one among the root and the clamp configured to penetrate into a cavity of the other among the root and the clamp.

11. The subassembly according to claim 10 wherein the at least one protrusion has a shape of a rectangular parallelepiped.

12. The subassembly according to claim 10 which comprises at least two protrusions on one among the root and the clamp configured to penetrate into a cavity of the other among the root and the clamp.

13. The subassembly according to claim 1 wherein the pads are two in number.

14. The subassembly according to claim 1 wherein the pads are four in number, the root having two faces, each face being directly in contact with two of the pads.

15. The subassembly according to claim 14 wherein the two pads in direct contact with each face are spaced away from one another.

16. The subassembly according to claim 1, wherein each pad has a wear indicator.

17. A turbomachine comprising a subassembly according to claim 1.

18. The turbomachine according to claim 17, wherein the turbomachine is an aircraft turbojet engine.

19. A method for manufacturing a turbomachine,
    the method comprising:
    assembling two pads in a form-fitting manner to one among a root of a low-pressure turbine nozzle ring and a clamp, the root being integral with a body of the nozzle ring,
    attaching the clamp to the root so that the pads are interposed between the root and the clamp, and
    attaching the clamp to a casing of the turbomachine.

20. A method for maintaining a turbomachine,
    the method comprising:
    disassembling a first pad interposed between a root of a low-pressure turbine nozzle ring of a turbomachine and a clamp configured to attach the root to a casing of the turbomachine, the root being integral with a body of the nozzle ring,
    assembling a second pad in place of the first pad in a form-fitting manner with one among the root and the clamp, and
    attaching the clamp to the root so that the second pad is interposed between the root and the clamp.

* * * * *